CATHODE RAY TUBE CIRCUIT

Filed Nov. 17, 1954

INVENTORS
George W. Fyler
BY Robert S. Meihorn

Mueller and Aichele
Attys.

United States Patent Office 2,828,357

Patented Mar. 25, 1958

2,828,357

CATHODE RAY TUBE CIRCUIT

George W. Fyler and Robert S. Melhorn, Lombard, Ill., assignors to Motorola, Inc., Chicago, Ill., a corporation of Illinois Application November 17, 1954, Serial No. 469,475

3 Claims. (Cl. 178—7.5)

Figures 1, 2:
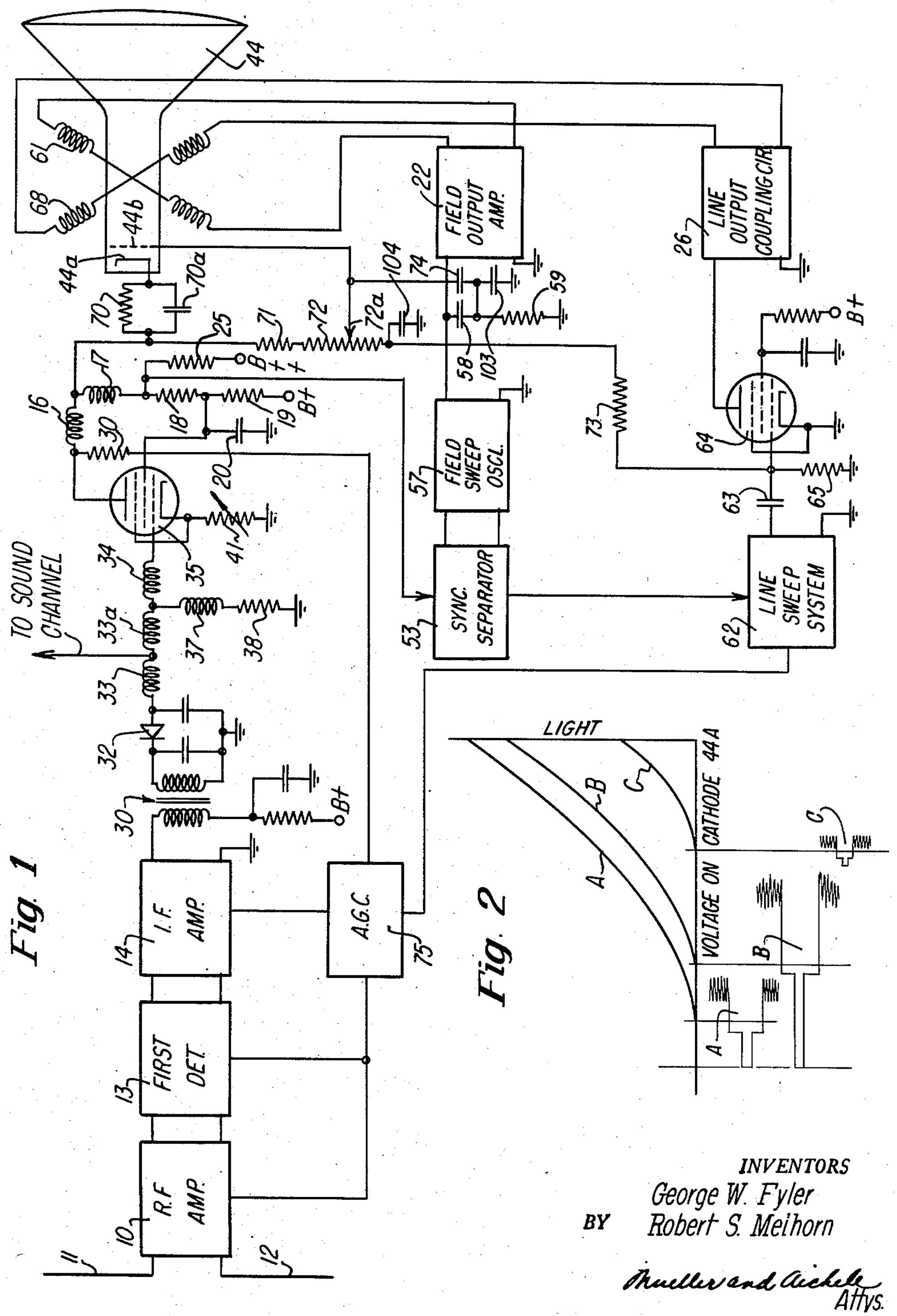

The present invention relates to television and more particularly to an improved television receiver for reproducing the televised intelligence of a monochrome television signal.

As is well known, the background illumination level of a received television signal requires both A. C. and D. C. components for proper reproduction of the televised scene. For this reason, it is desirable to use direct-current coupling between the second detector of the television receiver and the picture tube. However, the use of such direct-current coupling without further compensation has proved undesirable due to the difficulty of maintaining the cut-off level in the picture tube in substantial coincidence with the black level of the received television signal for variations in contrast setting of the receiver or in the intensity of the received signal. Attempts have been made in the past to use direct-current coupling and to compensate fully for the variations discussed above by means, for example, of self-biasing networks for the picture tube and without any further control. However, this has not proved entirely satisfactory due to the non-linearity of present day cathode-ray reproducing tubes, which impairs the accuracy and effectiveness of such self-biasing networks in maintaining the proper black level in the reproducing device for the aforementioned variations in the received television signal.

Because of the limitations in direct-current coupling described above, the use of alterating-current coupling between the second detector and the picture tube is in widespread use today. However, such coupling usually necessitates some type of direct-current restorer circuit, in order that the necessary background information of the televised scene may be reproduced. Such restoration has the disadvantage in that it usually requires additional circuitry; and also in that it is susceptible to ignition interference, and the like which produces spurious and distracting variations or flashes in the reproduced image.

It is an object of the present invention to provide an improved television receiver using at least partial direct-current coupling between the second detector and the image reproducing tube and which receiver is constructed so that the cut-off level in the reproducing tube is controlled to coincide substantially with the black level of the received television signal despite changes in the contrast settings of the receiver or in the intensity of the received signal.

Yet another object of the invention is to provide such an improved television receiver which is constructed so that the cut-off level in the reproducing tube varies to some extent with respect to the black level of the received television signal for changes in picture content of the received signal so as to maintain satisfactory reproduction in the presence of excessively white or excessively black pictures.

A more general object of the invention is to provide an improved television receiver that uses inherently simple and economical circuits, and which may be controlled efficiently to produce a satisfactory image that does not vary appreciably in any unwanted manner with changes in the condition of the received television signal or with changes in control settings of the receiver.

A feature of the invention is the provision of an improved television receiver in which the second detector is coupled through a video amplifier to the image reproducer by direct-current coupling circuits, and which receiver includes a control network coupled to the reproducer for developing a potential corresponding to the average anode potential of the video amplifier, which potential is used to control the cut-off level of the reproducer so that it is maintained in substantial coincidence with the black level of a received television signal for variations in the contrast settings of the receiver.

The above and other features of the invention which are believed to be new are set forth with particularity in the appended claims. The invention itself, however, together with further objects and advantages thereof, may best be understood by reference to the following description when taken in conjunction with the accompanying drawing in which:

Fig. 1 is a circuit diagram of a television receiver constructed in accordance with the invention; and Fig. 2 comprises various cathode voltage vs. light output curves of the image reproducer of the receiver useful in understanding the invention.

The invention provides a television receiver which comprises apparatus for selecting and amplifying a received television signal. A detector circuit is coupled to the selecting and amplifying apparatus and the detector demodulates the received television signal and produces in response thereto a composite video signal having a direct-current component with respect to a point of reference potential. A video amplifier for amplifying the composite video signal is provided and includes a discharge device having an anode, a cathode and a control electrode. The control electrode is coupled to the detector through a direct-current coupling network. A variable resistor is connected between the cathode and the point of reference potential, and this resistor controls the gain of the video amplifier for contrast control purposes. A cathode-ray image reproducing device has a first input electrode coupled to the anode of the video amplifier through a direct-current coupling network, and a brightness level control network is connected between this input electrode and a point of reference potential. The brightness control has a movable arm which is connected to a second input electrode of the image reproducer to supply a manually variable bias potential to that electrode, and which bias potential has a predetermined proportional relation to the average potential of the anode of the video amplifier. With this arrangement, changes in the black level of the composite video signal supplied to the reproducing device from the video amplifier due to changes in the contrast setting of the receiver, or in the signal level (particularly for weak signals below AGC control level) produce a corresponding change in the bias of the reproducer so that the cut-off level of the reproducer may be controlled to coincide substantially with the black level of the signal impressed thereon, despite such variations.

The receiver illustrated in Fig. 1 includes a radio frequency amplifier 10 of one or more stages, and this amplifier has input terminals connected to a suitable antenna 11, 12 and output terminals connected through a first detector 13 to an intermediate frequency amplifier 14 of any desired number of stages. Intermediate frequency amplifier 14 is coupled through a second detector including rectifier 32, and through a video amplifier including an electron discharge device 35, to the cathode 44*a* of a cathode-ray image reproducing device 44. Rectifier 32 is coupled to the output terminal of intermediate frequency amplifier 14 through a usual coupling network including a transformer 30, and the detector circuit of rectifier 32 is coupled to the control electrode of discharge device 35 through a direct-current coupling network including a plurality of peaking and I. F. suppression coils 33, 33*a*, and 34 connected in series between the rectifier and the control electrode. The junction of coils 33*a* and 34 is connected to a point of reference potential or ground through a shunt peaking coil 37 and a load resistor 38. The junction of coils 33 and 33*a* is connected to the sound channel of the receiver, and since this channel forms no part of the present invention it is not shown and will not be described.

Video amplifier discharge device 35 has its cathode connected to the point of reference potential through a variable contrast control 41 which, in this instance, is shown as a variable resistor and which serves to control the gain of the video amplifier. The anode of device 35 is connected through a video peaking coil 16 to the common junction of a pair of resistors 70 and 71. Resistor 70 is connected to the cathode 44*a* of the reproducer 44 and is shunted by a capacitor 70*a*. Resistor 71 is connected to one end of a variable resistor 72, the other end of which is coupled to a negative potential source as will be explained. Resistor 72 forms the brightness control for the receiver and has a movable arm 72*a* which is directly connected to the control electrode 44*b* of reproducing device 44. The video amplifier discharge device is, therefore, coupled to reproducer 44 through a direct-current coupling network including elements 16 and 70. Network 70, 70*a* helps to prevent excessive brightness or "blooming" of the picture tube at maximum contrast settings.

The peaking coil 16 is coupled through a shunt peaking coil 17 and resistors 18 and 19 to the positive terminal B+ of a source of uni-directional potential, and the junction of the latter two resistors is connected to the screen electrode of device 35 which is by-passed to ground through a capacitor 20. The junction of coil 17 and resistor 18 is connected to a synchronizing signal separator 53, and through a resistor 25 to the positive terminal B++ of a source of unidirectional potential of higher value than the potential at the terminal B+. Separator 53 is connected to the field sweep oscillator 57 of the receiver, and the output terminals of the field sweep oscillator are connected to the point of reference potential through a discharge condenser 58 and series connected peaking resistor 59. The signal across elements 58 and 59 is impressed on the field output amplifier 22 and from there to the field deflection element 61 of reproducer 44.

The junction of condenser 58 and resistor 59 is connected to the movable arm 72*a* of brightness control resistor 72 through a capacitor 74, and this junction is by-passed to ground through a capacitor 103. The junction of capacitors 74, 103 is connected to the junction of capacitor 58 and resistor 59 so that retrace blanking pulses may be supplied to picture tube 44. Capacitors 74 and 103 also constitute a low impedance path to ground from control electrode 44*b* of the reproducer 44 so that any arcing within the reproducer will not produce a high voltage on this control electrode which could cause damage to the cathode and heater elements of the reproducer.

Synchronizing signal separator 53 is also coupled to a line sweep system 62, and the output terminals of the line sweep system are coupled through a capacitor 63 to the control electrode of an output amplifier discharge device 64. The control electrode of device 64 is connected to ground through a resistor 65, and this control electrode is connected through an isolating resistor 73 to the lower side of the brightness control resistor 72. The anode of the line sweep amplifier 64 is coupled through a usual line output coupling circuit 26 to the line deflection element 68 of reproducer 44.

The receiver also includes an automatic gain control (AGC) circuit 75 which may be of any known gated type and is direct-current connected through a resistor 30 to the anode of video amplifier discharge device 35. The AGC circuit 75 is preferably of the type which selectively controls the radio frequency amplifier 10 and first detector 13 with respect to the intermediate frequency amplifier 14 so that for medium intensity signals, only the intermediate frequency amplifier is controlled, and for high intensity signals the R. F. amplifier and first detector are controlled in addition to the intermediate frequency amplifier.

The operation of the receiver may best be understood by considering the circuit of Fig. 1 in conjunction with the curves of Fig. 2. A monochrome television signal which includes video frequency components and synchronizing components and which is intercepted by the antenna 11, 12 is selected and amplified by radio frequency amplifier 10. The amplifier television signal from the radio frequency amplifier is heterodyned to the selected intermediate frequency of the receiver in first detector 13, and the resulting intermediate frequency signal is amplified in intermediate frequency amplifier 14. The amplified intermediate frequency signal is detected by second detector 32 to produce a composite video signal including video frequency components and synchronizing components for application to video amplifier discharge device 35. The detector 32 is so poled that the composite video signal applied to video amplifier 35 has a negative direct-current (D. C.) axis and the synchronizing components thereof extend in a negative-going direction.

The composite video signal is amplified in amplifier 35 and is supplied to the cathode of image reproducer 44 on a positive direct-current axis and with the synchronizing components extending in a positive-going direction. The coupling between the second detector and the image reproducer is such that sufficient background information is imparted to the reproduced image without the need for separate background restoration circuits.

As previously noted, the contrast of the receiver is controlled by varying the contrast control element 41 in the cathode circuit of video amplifier discharge device 35. Variation of this element controls the gain of video amplfier 35 and, therefore, the amplitude of the composite video signal supplied to reproducer 44. The AGC circuit 75 responds to the peaks of the synchronizing components in the output circuit of device 35 to maintain the peak potential of the synchronizing components substantially constant, irrespective of signal amplitude in the plate circuit.

Fig. 2 shows the composite video signal as applied to the cathode of the reproducer 44. When the receiver is properly set for the reproduction of a received television signal, the brightness control is adjusted so that the movable tap 72*a* supplies an appropriate bias to the control electrode 44*b* of the reproducer to set its cut-off level slightly below the blanking level of the composite video signal applied thereto. Therefore, for signal A, the brightness control is adjusted with respect to curve A to achieve this condition.

The composite video signal B of Fig. 2 shows the effect of an increase in contrast by adjustment of resistor 41. The increase in contrast results from an increase in the gain of device 35 and causes the composite video signal B to have an increased amplitude, but with the peaks of the synchronizing components held by the AGC circuit 75 at substantially the same level as the synchronizing component peaks of signal A, but with the black level of the signal B (as represented by the peaks of its blanking components) being displaced in the negative direction from the black level of signal A. The blanking level of composite video signal B as impressed on the cathode 44*a* of image reproducer 44, therefore, drops below the cut-off level of the reproducer as represented by curve A. However, resistor 71 and the portion of resistor 72 above movable tap 72a form a network with capacitors 74 and 103, that responds to the composite video signal to supply D. C. potential to the control electrode 44b of device 44 that is a function of the average plate voltage of amplifier 35 or the average value of the composite video signal impressed on the cathode 44a. Therefore, when the amplitude of the composite video signal changes from that shown in signal A to that shown by signal B due to a change in the contrast setting, the compensating voltage impressed on the control electrode 44b by filter 71-72, 74, 103 changes the cut-off level of device 44 to that shown by curve B, so that the cut-off or black level of the image reproducer remains in substantial coincidence with the black level of the composite video signal B. Network 70, 70a also provides increased bias for device 44 for signal B so that the voltage impressed on the control electrode 44b by the filter referred to above provides only part of the compensation, for example, 50%.

Therefore, when the movable tap 72a is adjusted to a received television signal so that the proper brightness relation exists in reproducer 44, that is, so that the cut-off level of the reproducer corresponds substantially to the black level of the received signal, the network 71, 72, 74 and 103, in conjunction with network 70, 70a, provides that changes in amplitude of the composite signal impressed on the cathode 44 due to changes in the contrast setting produce a compensation in the reproducer so that its black level remains in substantial coincidence with the black level of the impressed composite video signal.

The average voltage developed by the network to be impressed on the control electrode 44b of picture tube 44 also varies in accordance with variations in picture content of the composite video signal so as to produce variations in the cut-off level of the image reproducer. This is not undesirable, for on a predominantly white picture the large amount of plate current drawn by the picture tube can cause reduction in horizontal size and loss of linearity. The present invention alleviates this condition by reducing the plate current that would normally flow in the picture tube in the presence of such white pictures. Furthermore, on essential black pictures, the circuit of the present invention provides a small amount of residual brightness which is needed to overcome the effects of external room lighting.

The line sweep system 62 includes a usual horizontal oscillator, and that oscillator supplies a sawtooth signal to the control electrode of device 64. The sawtooth signal biases the control electrode negatively, for example, to aobut 30 volts, so that the control electrode forms a convenient, stable negative potential source for the brightness control resistor 72. The sawtooth signal on the control electrode is by-passed to ground through a capacitor 104 so that it does not appear in the input circuit of picture tube 44, and so that it does not appear across capacitor 103 in the field sweep system which would adversely affect the interlace of the reproduced image.

The purpose of returning the brightness control resistor 72 to a negative source rather than to ground is to maintain the control electrode of the reproducer sufficiently negative with respect to the cathode in the presence of extremely weak signals, such as shown by the signal C, which have insufficient amplitude to actuate the AGC circuit. In the presence of such signals the contrast control 41 is usually set to maximum contrast and, therefore, relatively low average plate voltage for the video amplifier 35. When the brightness control resistor 72 is returned to ground there is insufficient bias on the control electrode 44b in the presence of such weak signals and high contrast to prevent excessive brightness on the screen of the reproducer so that such signals cannot be satisfactorily reproduced. By returning resistor 72 to the negative source, the reproducer characteristics are established as shown by curve C under the above conditions. That is, excessive brightness is prevented, allowing the contrast control to be set to maximum gain of the video amplifier so that the picture intelligence of the signal may be reproduced.

For signals of sufficient amplitude to actuate the AGC circuit 75, changes of intensity have no noticeable effect on the reproduced image. This is because the AGC circuit maintains the peaks of the composite video signal impressed on the reproducer at a substantially fixed level, and also maintains the amplitude of such composite video signal substantially constant.

The invention provides, therefore, a television receiver in which the composite video signal is recovered at the second detector and fed to the image reproducer through a coupling network which is constructed so that sufficient background information is supplied to the reproducer without the need for direct-current restoration circuits. Moreover, the receiver is constructed so that changes in intensity of the received signal or in contrast settings of the receiver do not affect materially the proper coincidence between the cut-off level in the picture tube and the black level of the received television signal. Moreover, the receiver is constructed so that changes in picture content of the received signal produce desirable changes in the background of the reproduced image.

We claim:

1. A television receiver including in combination apparatus for selecting and amplifying a received television signal; a detector circuit for demodulating the received television signal to produce a composite video signal having video frequency components, synchronizing components and blanking components, with the peak amplitude of said blanking components representing a black level in the composite video signal and with the composite video signal being disposed on a negative direct-current axis with respect to a point of reference potential and with said synchronizing and blanking components extending in a negative-going direction; a video amplifier for amplifying the composite video signal and including an electron discharge device having a control electrode, an anode and a cathode; a first direct-current coupling circuit between said detector and said control electrode of said video amplifier discharge device; a variable contrast control resistor connecting said cathode of said video amplifier discharge device to said point of reference potential; a cathode-ray image reproducing device having a cathode and a control electrode; a second direct-current coupling circuit between said anode of said video amplifier discharge device and said cathode of said cathode-ray reproducing device for impressing said composite video signal on said cathode of said reproducing device with a direct-current axis that is positive with respect to said point of reference potential and with said synchronizing and blanking components extending in a positive-going direction with the black level represented by the peak amplitude of said blanking components being subject to vary; a gated automatic gain control circuit connected to said second coupling circuit and keyed at time intervals related to the synchronizing components of the received television signal for maintaining essentially constant the peak amplitude of the synchronizing components of the composite video signal impressed on said cathode of said reproducing device; a brightness control resistor connected to said second direct-current coupling circuit and connecting said second direct-current coupling circuit to a point of a selected potential level, means including a variable tap on said brightness control resistor connected to said control electrode of said image reproducing device for supplying to said control electrode of said image reproducing device a potential that varies in accordance with variations in the average value of said composite video signal so as to control the beam cut-off level in said reproducing device and maintain said cut-off level in substantial coincidence with said black level of said composite video signal for changes in said contrast control resistor and in the intensity of the received television signal.

2. A receiver such as set forth in claim 1 in which said brightness control resistor is connected between said second coupling circuit and a potential level that is negative as compared with said point of reference potential.

3. A television receiver including in combination apparatus for selecting and amplifying a received television signal, a detector circuit for demodulating the received television signal to produce a composite video signal having video frequency components, synchronizing components and blanking components, with the peak amplitude of said blanking components representing a black level in the composite video signal and with the composite video signal being disposed on a negative direct-current axis with respect to a point of reference potential and with said synchronizing and blanking components extending in a negative-going direction; a video amplifier for amplifying the composite video signal and including an electron discharge device having a control electrode, an anode and a cathode; a first direct-current coupling circuit between said detector and said control electrode; a variable contrast control resistor connecting said cathode to said point of reference potential; a cathode-ray image-reproducing device having a cathode and a control electrode; a second direct-current coupling circuit between said anode of said video amplifier discharge device and said cathode of said reproducing device for impressing said composite video signal on said cathode of said reproducing device with a direct-current axis that is positive with respect to said point of reference potential and with said synchronizing and blanking components extending in a positive-going direction with the black level represented by the peak amplitude of said blanking components being subject to vary; a line sweep system for supplying a line deflection signal to said image reproducer; an output amplifier included in said sweep system and including an electron discharge device having a control grid established at a negative bias potential with respect to said point of reference potential; a brightness control resistor having a variable tap connected to said control electrode of said image reproducing device; and means connecting said brightness control resistor to said control grid of said electron discharge device in said line sweep system output amplifier.

References Cited in the file of this patent

UNITED STATES PATENTS 2,301,522 Cawein --------------- Nov. 10, 1942